United States Patent
Bube et al.

(10) Patent No.: US 12,293,328 B1
(45) Date of Patent: May 6, 2025

(54) PRODUCT STOCK NOTIFICATION SYSTEM INCLUDING IMAGE-BASED REPLACEMENT PRODUCT PROMPTING AND RELATED METHODS

(71) Applicant: Inmar Clearing, Inc., Winston-Salem, NC (US)

(72) Inventors: Melissa Bube, High Point, NC (US); Justin A. Krull, Weirton, WV (US); Jason Wyatt, Advance, NC (US); Jules Amosah, Lewisville, NC (US); Samuel Gonsalves, Austin, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 314 days.

(21) Appl. No.: 17/714,831

(22) Filed: Apr. 6, 2022

(51) Int. Cl.
  G06Q 10/08       (2024.01)
  G06Q 10/087      (2023.01)
  G06Q 30/0201     (2023.01)
  G06Q 30/0208     (2023.01)
  G06Q 30/0601     (2023.01)

(52) U.S. Cl.
  CPC ....... *G06Q 10/087* (2013.01); *G06Q 30/0201* (2013.01); *G06Q 30/0208* (2013.01); *G06Q 30/0643* (2013.01)

(58) Field of Classification Search
  CPC .......................................... G06Q 10/00–90/00
  See application file for complete search history.

(56) References Cited

U.S. PATENT DOCUMENTS

| | | | |
|---|---|---|---|
| 8,091,782 B2 | 1/2012 | Cato et al. | |
| 9,053,483 B2 | 6/2015 | Geisner et al. | |
| 10,410,177 B2 | 9/2019 | Causey et al. | |
| 10,474,858 B2 | 11/2019 | Davis et al. | |
| 10,592,962 B1* | 3/2020 | Lauka | G06K 7/10881 |
| 2002/0099631 A1* | 7/2002 | Vanker | G06Q 30/0611 705/28 |
| 2004/0172341 A1* | 9/2004 | Aoyama | G06Q 10/08 705/26.1 |
| 2005/0149414 A1* | 7/2005 | Schrodt | G06Q 10/087 705/29 |
| 2010/0010902 A1 | 1/2010 | Casey | |
| 2016/0171408 A1* | 6/2016 | Gooijer | G06Q 10/06315 705/7.25 |

(Continued)

*Primary Examiner* — Arif Ullah
(74) *Attorney, Agent, or Firm* — ALLEN, DYER, DOPPELT, + GILCHRIST, P.A.

(57) ABSTRACT

A product stock notification system may include a virtual shopping server to obtain images of available products on a display within a store from cameras within the store, identify the available products on the display based upon the images, and determine a quantity of the available products on the display from the images. The server may obtain a current stock quantity for each available product within the store, provide an image to a user device, and permit user selection of available products for purchase associated with the image. The server may, when, for the user-selected available product, the quantity of available products or the current stock quantity are below a threshold, obtain an image of the display adjacent the available product including a replacement product, provide the image to the user device, and cooperate with the user device to prompt the given user to select the replacement product for purchase.

20 Claims, 7 Drawing Sheets

(56) References Cited

U.S. PATENT DOCUMENTS

2016/0171432 A1\* 6/2016 Pugh ................ G06Q 30/0222
                                                705/26.81
2019/0228450 A1   7/2019 Waldron et al.
2020/0019754 A1\* 1/2020 Adato ................ G06V 20/62

\* cited by examiner

PRODUCT STOCK NOTIFICATION SYSTEM INCLUDING IMAGE-BASED REPLACEMENT PRODUCT PROMPTING AND RELATED METHODS

TECHNICAL FIELD

The present invention relates to the field of electronics, and more particularly, to stock notification systems and related methods.

BACKGROUND

A store, such as, for example, a grocery store, typically has aisles of products. Products may be stocked on shelves in each aisle or on other product displays (e.g., end-caps). To determine product stock level, the retailer, for example, may manually, based upon a visual inspection, determine when a product within the retail store is subject to a low stock condition. The retailer may then communicate this information to a stock person at the retailer.

Computers may assist in determining stock levels. For example, a retailer may know how many of any particular product were received and in stock, and may reduce stock numbers based upon known purchases of the product, for example, at a point-of-sale (POS) terminal. However, many retailers do not place all stock on a shelf, but rather may retain some stock in a stockroom. Moreover, damaged, lost, or stolen stock may not be considered in current stock levels.

Cameras may be used within a retail store. The cameras may monitor doors, cashier areas, etc. for security purposes. Cameras may also be used to perform stock analytics.

SUMMARY

A product stock notification system may include a plurality of cameras within a store, and a user device associated with a given user remote from the store. The product stock notification system may also include a virtual shopping server configured to obtain a plurality of images of available products on a display within the store from the plurality of cameras, and identify the available products on the display based upon at least one of the plurality of images. The virtual shopping server may be configured to determine a quantity of the available products on the display from the at least one image, obtain a current stock quantity for each of the plurality of available products within the store, and provide the at least one image to the user device for display thereon. The virtual shopping server may also be configured to permit user selection of one of the plurality of available products for purchase associated with the at least one image. The virtual shopping server may also be configured to, when, for the user-selected available product, at least one of the quantity of available products is below a threshold and the current stock quantity is below the threshold, obtain an image of the display adjacent the available product and that includes a replacement product, and provide the image of the display to the user device for display thereon, and cooperate with the user device to prompt the given user to select the replacement product for purchase.

The virtual shopping server may be configured to generate and communicate a digital promotion for the replacement product for purchase to the user device, for example. The virtual shopping server may be configured to communicate the user-selected available product to a product picker device, and when, for the user-selected available product, the at least one of the quantity of available products is below the threshold and the current stock quantity is below the threshold, communicate the replacement product for purchase to the product picker device.

The virtual shopping server may be configured to obtain historical stock data and set the threshold based upon the historical stock data. The historical stock data may include historical quantities of the available products and historical sales data for the plurality of available products.

The historical stock data may include historical restocking times and historical restocking quantities for the plurality of available product, for example. The virtual shopping server may be configured to operate a machine learning algorithm to set the threshold based upon the historical stock data, the quantity of the available products on the display, and the current stock quantity. The virtual shopping server may be configured to operate the machine learning algorithm to predict a product sales rate of each of the plurality of available products based upon the historical stock data, and set the threshold based upon the predicted product sales rate, for example.

The virtual shopping server may be configured to determine a discrepancy between the quantity of the available products on the display and the current stock quantity for each of the plurality of available products within the store, and set the threshold based upon the discrepancy, for example. The virtual shopping server may be configured to obtain historical restock data and set the threshold based upon the historical restock data A method aspect is directed to a virtual shopping method. The method may include using a virtual shopping server to obtain a plurality of images of available products on a display within a store from a plurality of cameras within the store, and identify the available products on the display based upon at least one of the plurality of images. The method may also include using the virtual shopping server to determine a quantity of the available products on the display from the at least one image, obtain a current stock quantity for each of the plurality of available products within the store, and provide the at least one image to a user device associated with a given user remote from the store for display thereon. The method may also include using the virtual shopping server to permit user selection of one of the plurality of available products for purchase associated with the at least one image. The method may further include using the virtual shopping server to, when, for the user-selected available product, at least one of the quantity of available products is below a threshold and the current stock quantity is below the threshold, obtain an image of the display adjacent the available product and including a replacement product, and provide the image of the display to the user device for display thereon, and cooperate with the user device to prompt the given user to select the replacement product for purchase.

A computer readable medium aspect is directed to a non-transitory computer readable medium for virtual shopping. The non-transitory computer readable medium includes computer executable instructions that when executed by a processor cause the processor to perform operations. The operations may include obtaining a plurality of images of available products on a display within a store from a plurality of cameras within the store, and identifying the available products on the display based upon at least one of the plurality of images. The operations may also include determining a quantity of the available products on the display from the at least one image, obtaining a current stock quantity for each of the plurality of available products within the store, and providing the at least one image to a user device associated with a given user remote from the store for display thereon. The operations may also include permitting user selection of one of the plurality of available products for purchase associated with the at least one image. The operations may further include, when, for the user-selected available product, at least one of the quantity of available products is below a threshold and the current stock quantity is below the threshold, obtaining an image of the display adjacent the available product and that includes a replacement product, and providing the image of the display to the user device for display thereon, and cooperating with the user device to prompt the given user to select the replacement product for purchase.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
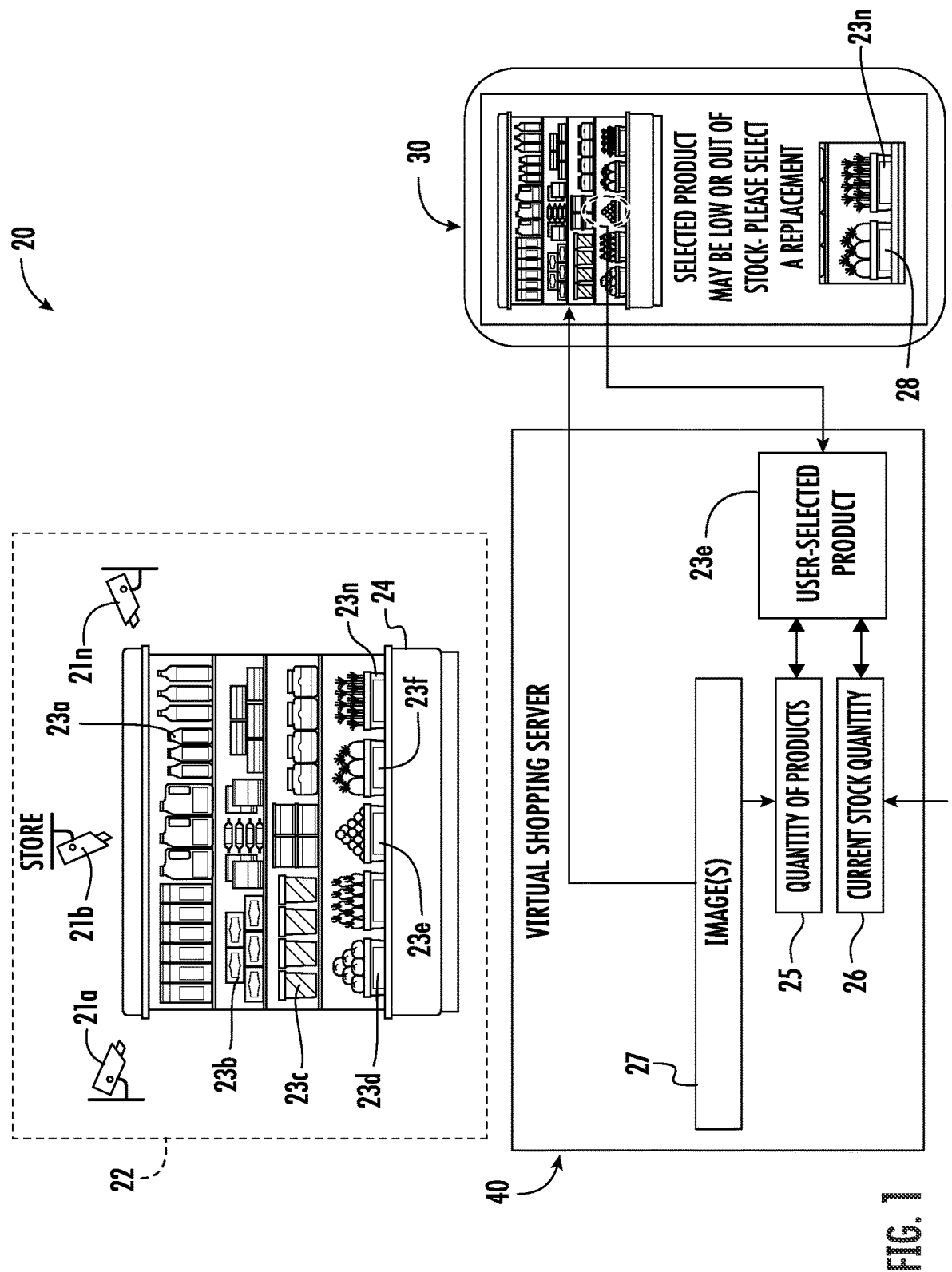
FIG. 1 is a schematic diagram of a product stock notification system.
Figure 2:
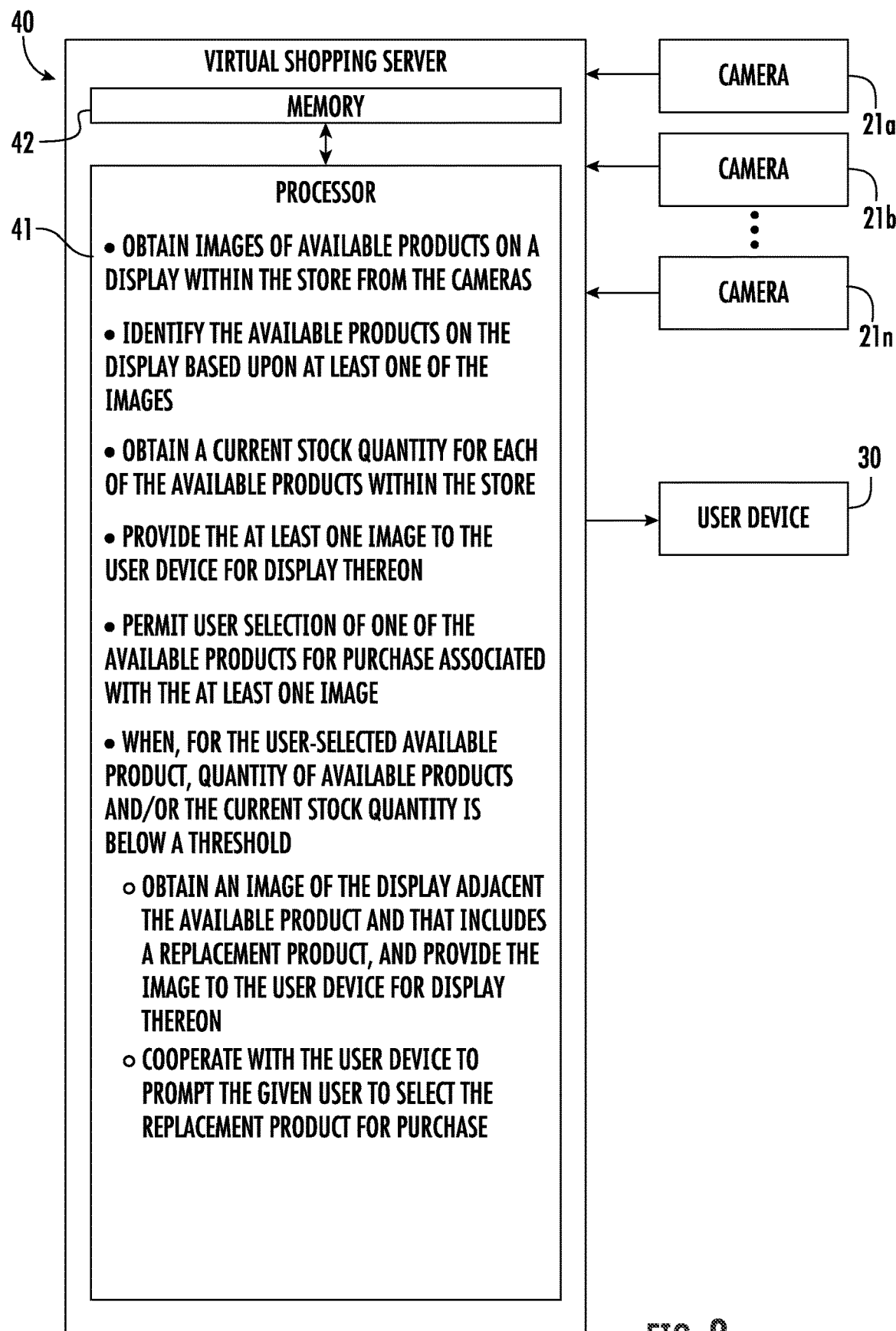
FIG. 2 is a schematic block diagram of the product stock notification system of FIG. 1.

Referring initially to FIGS. 1-2, a product stock notification system 20 includes cameras 21a-21n in a store 22. The cameras 21a-21n may be fixed at different locations within the store 22, for example, in different departments of the store. The cameras 21a-21n may be directed to or facing shelves of products. The cameras 21a-21n may have zoom, pan, and/or tilt capabilities, as will be appreciated by those skilled in the art.

The product stock notification system 20 also includes a user device 30 associated with a given user or shopper. The user device 30 is remote from the store 22, for example, and may be particularly advantageous for purchasing products, such as, for example, groceries, remote from the store. The user device 30 is illustratively in the form a mobile wireless communication device, and more particularly, a mobile or smartphone. The remote device 30 may be another type of device, for example, a tablet computer, a wearable computer, or a personal or desktop computer.

The product stock notification system 20 also includes a virtual shopping server 40. The virtual shopping server 40 includes a processor 41 and an associated memory 42. While operations of the virtual shopping server 40 are described herein, it should be appreciated that the operations are performed by way of cooperation between the processor 41 and memory 42.

Figure 3:
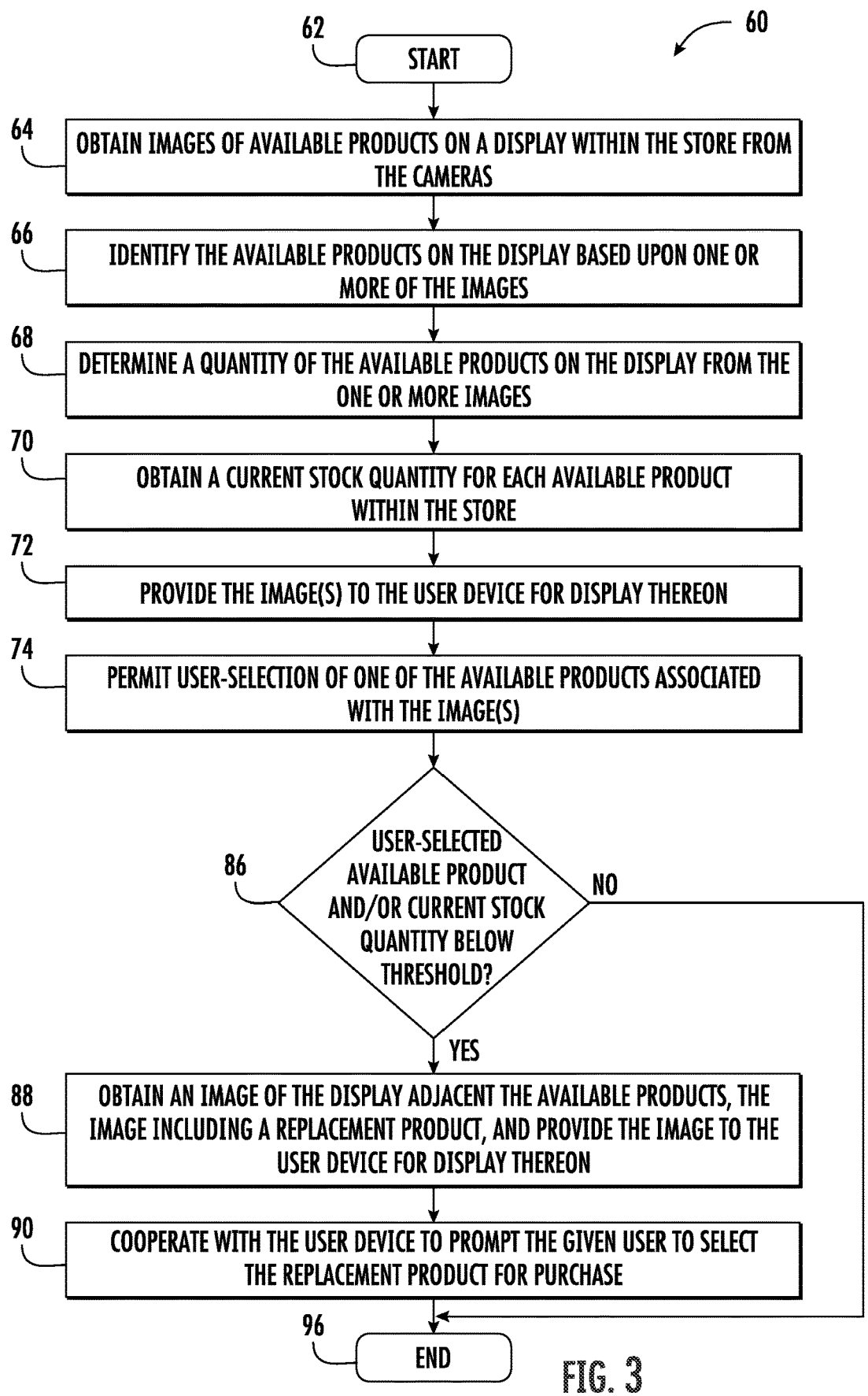
FIG. 3 is a flow chart illustrating operation of the virtual shopping server of FIG. 1.

Referring now to the flowchart 60 in FIG. 3, beginning at Block 62, operations of the virtual shopping server 40 will now be described. The virtual shopping server 40, at Block 64, obtains images 27 of available products 23a-23n on a display 24 within the store 21 from the cameras 21a-21n. More particularly, the images may be of products that are physically on the store shelves, and available for purchase. The images 27 may be used for other purposes, for example, security and/or surveillance.

At Block 66, the virtual shopping server 40 identifies the available products 23a-23n on the display 24 based upon the images 27. The virtual shopping server 40 may identify the available products based upon image recognition techniques, such as, for example, matching container or packaging size, shape, color, and/or identifying markers (e.g., text) to known or reference characteristics stored in a database in the memory 42. Machine readable codes on each available product 23a-23n may alternatively or additionally be used to identify the available products.

The virtual shopping server 40 determines a quantity 25 of the available products 23a-23n on the display 24 from the images (Block 68). More particularly, based upon the identification of the available products 23a-23n on the display 24, the virtual shopping server 40 determines the quantity by counting the amount of available products.

At Block 70, the virtual shopping server 40 obtains a current stock quantity 26 for each of the available products 23a-23n within the store 22. The current stock quantity 26 may be obtained from a retailer server, for example, or may be obtained from a database stored in the memory 42. In some embodiments, the virtual shopping server 40 may be communicatively coupled to POS terminals within the store 22, and the database may be updated based upon transactions at the POS terminals.

The virtual shopping server 40 provides, at Block 72, one or more of the images 27 to the user device 30 for display thereon. The given user may operate the user device 30 to select which image to display, for example, when each image corresponds to a different camera 21a-21n or camera angle (e.g., of a different shelf, portion of shelf, and/or different product on the shelf). The given user may manipulate the images to zoom in on a given shelf or portion thereof and the available products 23a-23n thereon. Text may be overlaid the images provided to the user device 30. For example, price, description, and quantity information (e.g., determined and/or obtained quantities).

At Block 74, the virtual shopping server 40 permits user selection of one or more of the available products for purchase 23a-23n associated with the one or more images 27. More particularly, the given user may select available products for purchase 23a-23n for placement in a virtual shopping cart or for purchase by a product picker, for example.

The virtual shopping server 40 determines when, for each user-selected available product 23e, either or both of the quantity of the available products is below a threshold or the current stock quantity is below the threshold (Block 86). As will be appreciated by those skilled in the art, when either or both of the quantity of the available products or the current stock quantity are below the threshold, a product may be near being sold out or unavailable. Thus, for example, when the user-selected available products 23e are selected or removed from the shelves for purchase, which may be some time later than the selection by the given user via the user device 30, there may be an increased probability that the user-selected available products may be sold out or otherwise unavailable when either or both of the quantity of the available products or the current stock quantity are below the threshold.

When, at Block 86, either or both the quantity of the available products and the current stock quantity is below the threshold, the virtual shopping server 40 obtains an image of the display 24 adjacent the user-selected available products 23e and provides the image of the display (Block 88). The image includes a replacement product 28, and may be a closer view of the shelf or display 24 so that other related (i.e., replacement) products are displayed.

The virtual shopping server 40, at Block 90, cooperates with the user device 30 to prompt the given user to select the replacement product 28 for purchase. Similar the selection of an available product described above, the given user may select, for example, to add to a virtual shopping cart for purchase or for picking from a picker device. As will be appreciated by those skilled in the art, when the risk is relatively high that the user-selected available product may not be available when picked from the display 24 or shelf, the virtual shopping server 40 may request the given user select a replacement product to ensure the given user obtains a product rather than no product at all. Operations end at Block 96.

Figure 4:
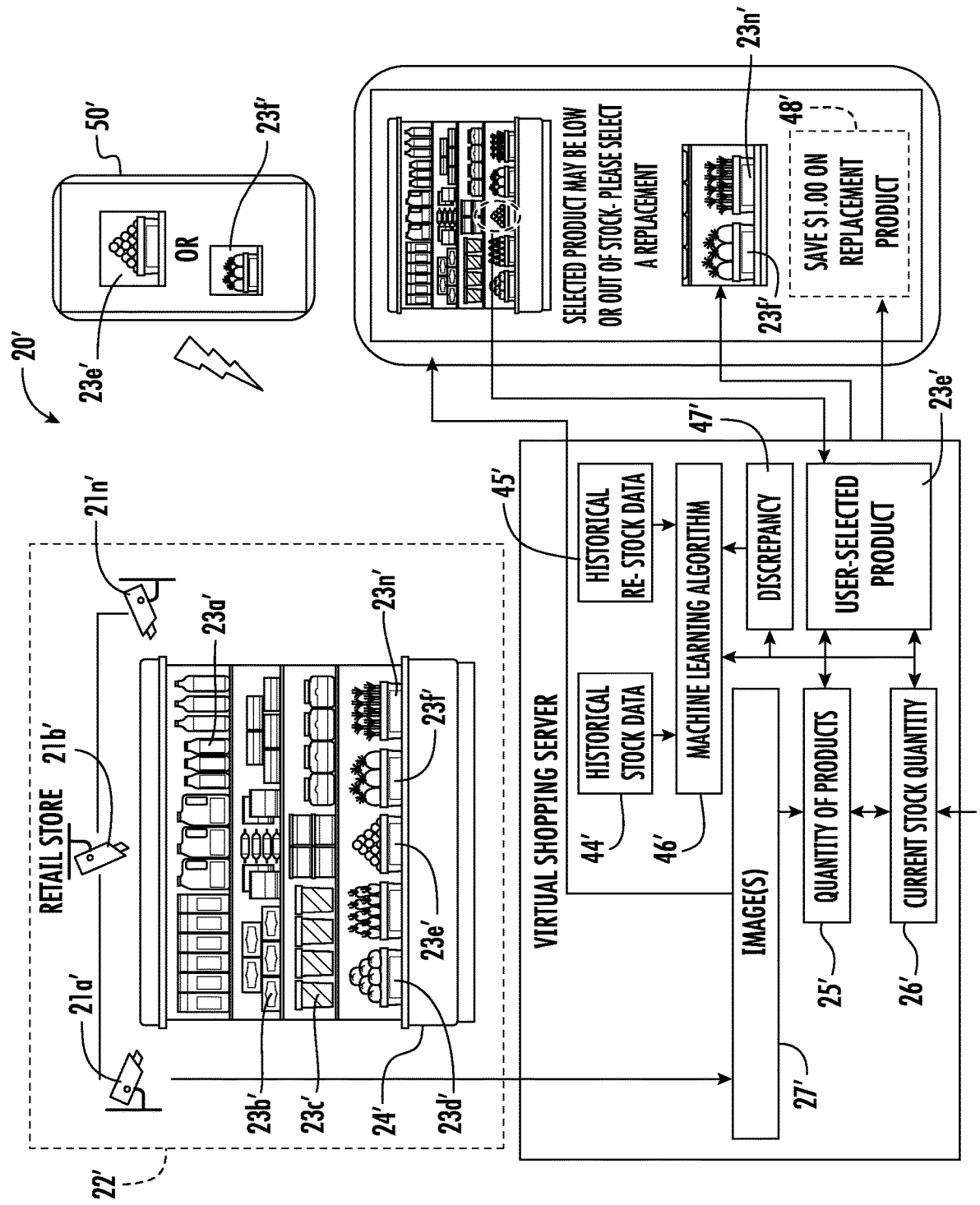
FIG. 4 is a schematic diagram of the product stock notification system in accordance with another embodiment.
Figure 5:
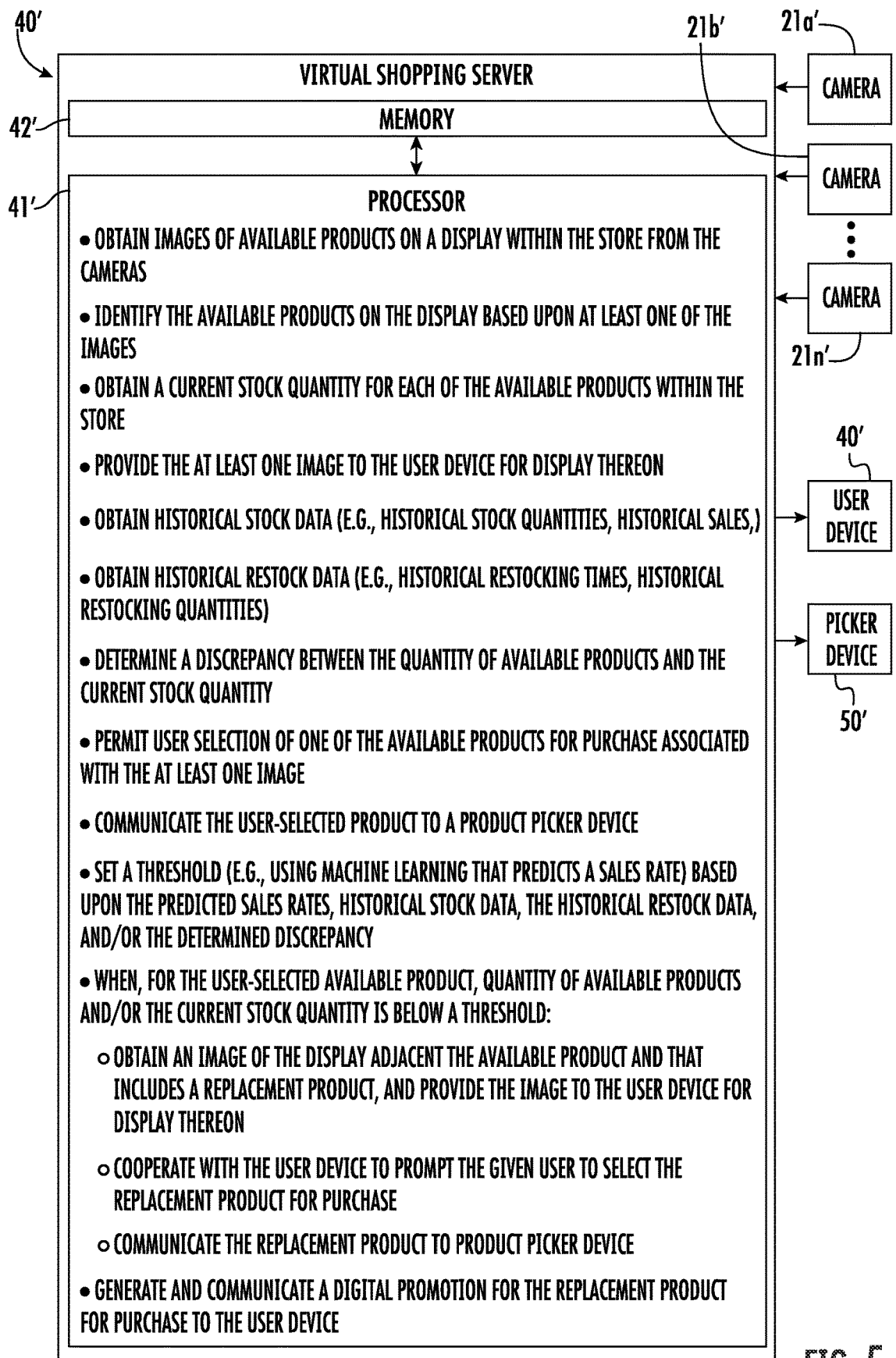
FIG. 5 is a schematic block diagram of the product stock notification system of FIG. 4.
Figure 6A:
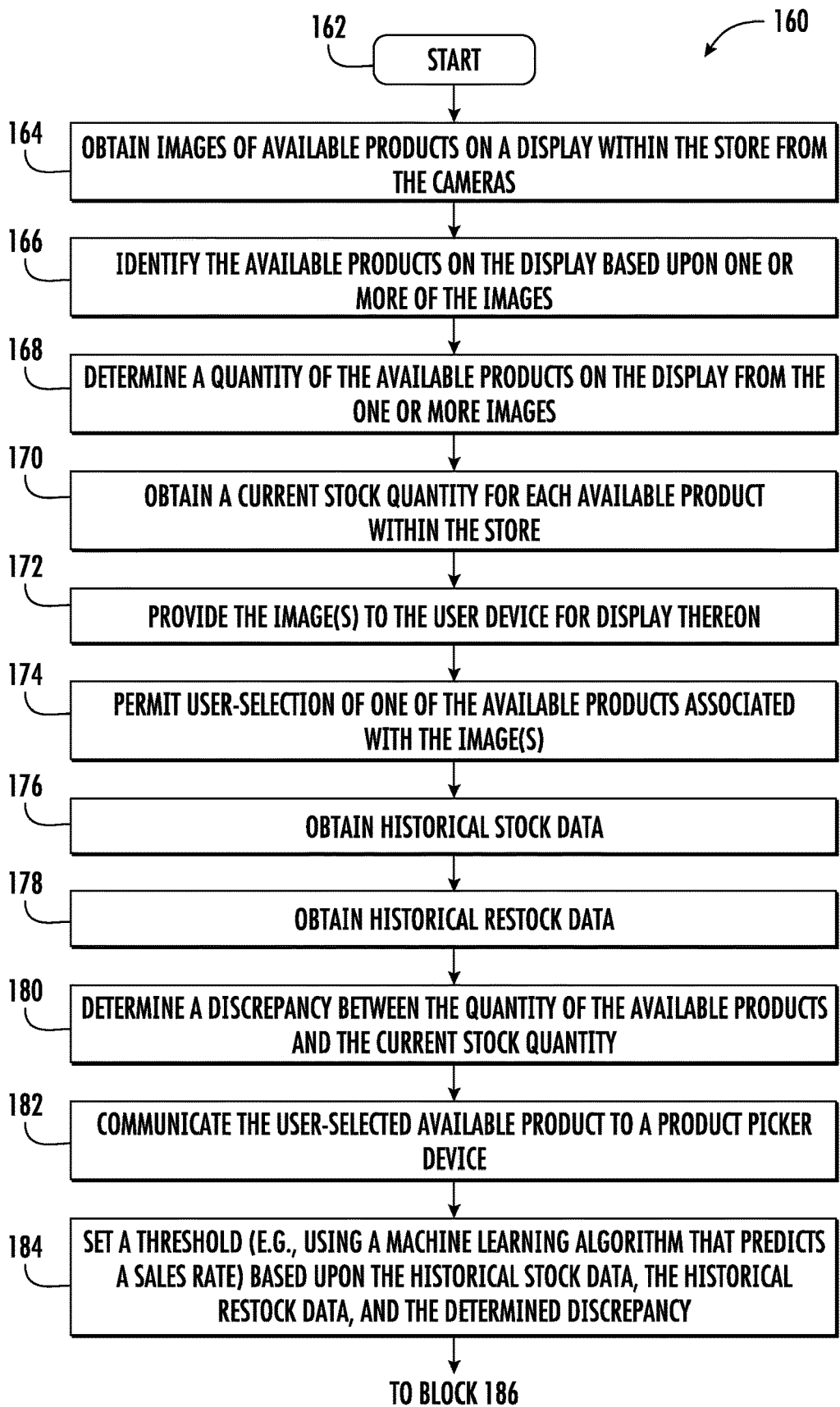
FIGS. 6A and 6B are flow diagrams illustrating more detailed operation of the virtual shopping server of FIG. 4.
Figure 6B:
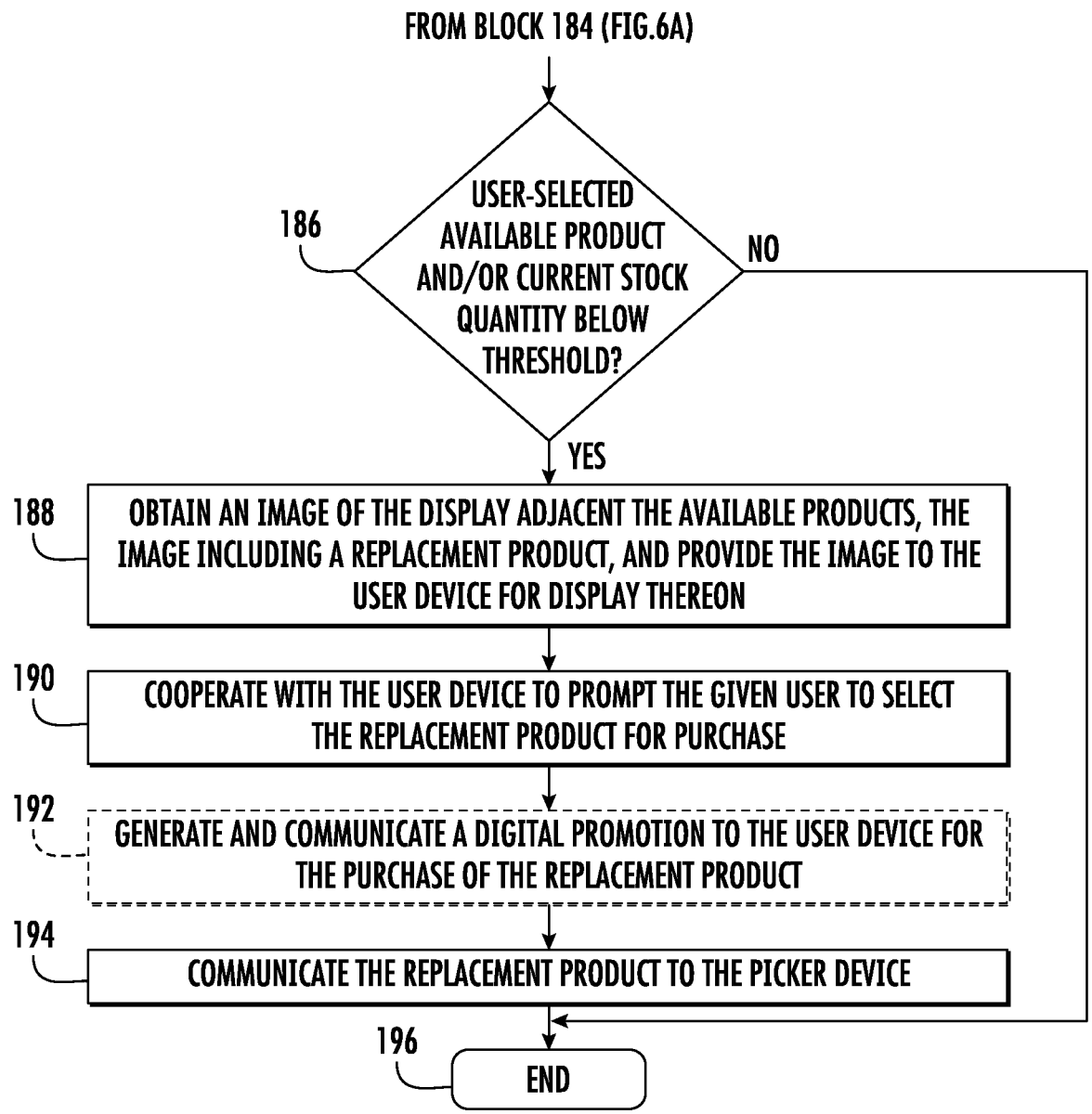

Referring now to FIGS. 4-5, and the flowchart 160 in FIGS. 6A and 6B, beginning at Block 162, further details of operation of the virtual shopping server 40' within a product stock notification system 20' in accordance with another embodiment will be described. At Block 176, the virtual shopping server 40' obtains historical stock data 44'. The historical stock data 44' may be stored in a database in the memory 42' or may be obtained from a remote server, for example. The historical stock data 44' may include historical quantities of available products and historical sales data for the available products. The historical stock data 44' may include other and/or additional data.

At Block 178, the virtual shopping server 40' obtains historical restock data 45'. The historical restock data 45' may be stored in a database in the memory 42' or may be obtained from a remote server, for example. The historical restock data 45' may include historical restocking times and historical restocking quantities. The historical restock data 45' may include data representative of when deliveries of new products are made and/or entered into inventory at the store 22'. In some embodiments, the historical restock data 45' may include a date or time when the restocked products are placed on display on the shelf. The historical restock data 45' may also include data representing a time between product order for restock and a time of delivery.

At Block 180, the virtual shopping server 40' determines a discrepancy 47' between the quantity of the available products 25' on the display 24' and the current stock quantity 26' for the user-selected available product 23e'. As will be appreciated by those skilled in the art, a discrepancy may be indicative of products that have been shopped or are in the process of being purchased. For example, a discrepancy may be indicative of available products being removed from the shelf, but not yet checked out, and/or products that may have been received (e.g., in a stockroom), but not restocked to the display 24' or shelf. At Block 182, the virtual shopping server 40' may communicate the user-selected available product 23e' to a product picker device 50', for example, a picker mobile wireless communications device.

At Block 184, the virtual shopping server 40' sets the threshold based upon the historical stock data 44', the historical restock data 45', and the determined discrepancy 47', if one exists. More particularly, the virtual shopping server 40' may, to set the threshold, operate a machine learning algorithm 46'. The machine learning algorithm 46' may set the threshold based upon the historical stock data 44', the quantity of the available products 25' on the display 24', and the current stock quantity 26'. The machine learning algorithm 46' may also set the threshold based upon the historical restock data 45'. In other words, the historical stock data 44', the quantity of the available products 25' on the display 24', the current stock quantity 26', and the historical restock data 45' may be inputs to the machine learning algorithm 46', updating, for example, each time new data is obtained. New data may be obtained in real time, as the data is obtained, at a desired interval, and/or as sales and stock data is updated, for example, when products are checked out (e.g., at a POS terminal), and/or when stock databases are updated, for example, when new stock is received.

The machine learning algorithm 46', for example, as an output, predicts a product sales rate of each of the available products 23a'-23n' based upon the historical stock data 44'. The threshold is set based upon the predicted sales rate and/or inventor levels. For example, a higher predicted sales rate may equate to lower sales levels during certain times, for example, times of day, month, year, etc. The threshold may be adjusted accordingly so that the given user is offered a replacement product when there is a relatively high chance the user-selected available product will be sold out.

The virtual shopping server 40' may generate and communicate a digital promotion 48' for the replacement product for purchase 23f' to the user device 30' (Block 192). The digital promotion 48' may be redeemable toward the purchase of the replacement product for purchase 23f', for example. The digital promotion 48' may be redeemable toward the user-selected product 23e', for example, to entice the given user to continue to purchase the user-selected product instead of switching to the replacement product for purchase 23f' if offered.

In some embodiments, the virtual shopping server 40' may generate the digital promotion 48' based upon a determined freshness level associated with the user-selected available product and/or replacement product for purchase 23f'. The freshness level may be obtained by optically recognizing text on the packaging based from the images of the available products, or, for example, in the case of fresh food, by comparing the available products to images of reference images at different points in an fresh food aging process. The redeemable value of the digital promotion 48' may be determined based upon the freshness level.

At Block 194, the virtual shopping server 40' may communicate, when, for the user-selected available product 23e', one of the quantity of available products 25' is below the threshold and the current stock quantity 26' is below the threshold, the replacement product for purchase 23f' to the product picker device 50. For example, the virtual shopping server 40' may send both the user-selected available product 23e' and the replacement product 23f' to the product picker device 50'.

As will be appreciated by those skilled in the art, the product stock notification system 20 may be particularly advantageous for addressing the problem of substitutions, for example, when virtually or electronically shopping at a store where product movement or overturn occurs at a relatively high rate or frequency. A typical prior art system simply permits a given user to select whether or not to allow substitutes—the substitutes being chosen by product picker. In contrast, the present embodiments permit the given user to select the substitute or replacement product for selected products that are likely to be sold out or have no stock when the picker shops the products.

Blocks 164-174, and 186-190 are similar to Blocks 64-74, and 86-90, respectively, described above. Moreover, elements 21a'-21n', 22', 27', 41', and 42' illustrated are similar to the elements 21a-21n, 22, 27, 41 and 42, above. While operations of the virtual shopping server 40 have been described in a particular order, those skilled in the art will appreciate that the operations described herein may be performed in another order or simultaneously. Operations end at Block 196.

A method aspect is directed to a virtual shopping method. The method includes using a virtual shopping server 40 to obtain a plurality of images 27 of available products 23a-23n on a display 24 within a store 22 from a plurality of cameras 21a-21n within the store, and identify the available products on the display based upon at least one of the plurality of images. The method also includes using the virtual shopping server 40 to determine a quantity of the available products 25 on the display 24 from the at least one image, obtain a current stock quantity 26 for each of the plurality of available products within the store 22, and provide the at least one image to a user device 30 associated with a given user remote from the store for display thereon. The method also includes using the virtual shopping server 40 to permit user selection of one of the plurality of available products 23a-23n for purchase associated with the at least one image 27. The method also includes using the virtual shopping server 40 to, when, for the user-selected available product 23e, at least one of the quantity of available products 25 is below a threshold and the current stock quantity 26 is below the threshold, obtain an image of the display 24 adjacent the available product and that includes a replacement product 28, and provide the image of the display to the user device 30 for display thereon, and cooperate with the user device to prompt the given user to select the replacement product for purchase.

A computer readable medium aspect is directed to a non-transitory computer readable medium for virtual shopping. The non-transitory computer readable medium includes computer executable instructions that when executed by a processor 41 cause the processor to perform operations. The operations include obtaining a plurality of images 27 of available products 23a-23n on a display 24 within a store 22 from a plurality of cameras 21a-21n within the store, and identifying the available products on the display based upon at least one of the plurality of images. The operations also include determining a quantity of the available products 25 on the display 24 from the at least one image 27, obtaining a current stock quantity 26 for each of the plurality of available products 23a-23n within the store 22, and providing the at least one image to a user device 30 associated with a given user remote from the store for display thereon. The operations also include permitting user selection of one of the plurality of available products 23e for purchase associated with the at least one image 27. The operations further include, when, for the user-selected available product 23e, at least one of the quantity of available products 25 is below a threshold and the current stock quantity 26 is below the threshold, obtaining an image of the display 24 adjacent the available product and that includes a replacement product 28, and provide the image of the display to the user device 30 for display thereon, and cooperating with the user device to prompt the given user to select the replacement product for purchase.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product stock notification system comprising:
a plurality of cameras within a store configured to capture a plurality of live images of available products on a display within the store;
a user device associated with a given user remote from the store; and
a virtual shopping server configured to
store a plurality of reference characteristics associated with the available products on the display within the store,
obtain the plurality of live images of the available products on the display within the store from the plurality of cameras,
apply image recognition to identify the available products on the display based upon at least one of the plurality of live images by matching product characteristics associated with the available products and comprising packaging size, packaging shape, packaging color, and optically recognized package text, to the plurality of stored reference characteristics and by matching a machine readable code on each of the available products,
determine a quantity of the available products on the display from the at least one live image based upon the identification of the available products on the display,
obtain a current stock quantity for each of the plurality of available products within the store,
provide the at least one live image to the user device for display thereon,
permit user selection of one of the plurality of available products for purchase associated with the at least one live image,
obtain historical stock data,
operate a machine learning algorithm to set a threshold, the machine learning algorithm accepting as input thereto, the historical stock data, the quantity of the available products on the display, and the current stock quantity, the machine learning algorithm generating as output a predicted product sales rate of each of the plurality of available products and set the threshold based upon the predicted product sales rate, the machine learning algorithm being updated based upon obtaining updated current stock quantity data, updated historical stock data, and updated quantity of available products with each iteration of the machine learning algorithm, and
when, for the user-selected available product, at least one of the quantity of available products is below the threshold and the current stock quantity is below the threshold,
obtain a live image of the display adjacent the available product and comprising a replacement product, the live image of the display adjacent the available product being captured by one of the plurality of cameras, provide the live image of the display adjacent the available product and including the replacement product to the user device for display thereon so that the live image of the display including the replacement product is displayed with less than all the plurality of available products for purchase associated with the at least one live image, and cooperate with the user device to prompt the given user to select the replacement product for purchase.

2. The product stock notification system of claim 1 wherein the virtual shopping server is configured to generate and communicate a digital promotion for the replacement product for purchase to the user device.

3. The product stock notification system of claim 1 wherein the virtual shopping server is configured to communicate the user-selected available product to a product picker device, and when, for the user-selected available product, the at least one of the quantity of available products is below the threshold and the current stock quantity is below the threshold, communicate the replacement product for purchase to the product picker device.

4. The product stock notification system of claim 1 wherein the historical stock data comprises historical quantities of the available products and historical sales data for the plurality of available products.

5. The product stock notification system of claim 1 wherein the virtual shopping server is configured to determine a discrepancy, for the user-selected available product, between the quantity of the available products on the display and the current stock quantity within the store, and operate the machine learning algorithm to set the threshold based upon the discrepancy by accepting as input to the machine learning algorithm, the discrepancy.

6. The product stock notification system of claim 1 wherein the virtual shopping server is configured to obtain historical restock data and operate the machine learning algorithm to set the threshold based upon the historical restock data by accepting as input to the machine learning algorithm, the historical restock data.

7. The product stock notification system of claim 6 wherein the historical restock data comprises historical restocking times and historical restocking quantities for the plurality of available product.

8. A virtual shopping server for a product stock notification system comprising a plurality of cameras within a store configured to capture a plurality of live images of available products on display within the store, and a user device associated with a given user remote from the store, the virtual shopping server comprising:

a processor and an associated memory configured to store a plurality of reference characteristics associated with the available products on the display within the store, obtain the plurality of live images of the available products on the display within the store from the plurality of cameras, apply image recognition to identify the available products on the display based upon at least one of the plurality of live images by matching product characteristics associated with the available products and comprising packaging size, packaging shape, packaging color, and optically recognized package text, to the stored reference characteristics and by matching a machine readable code on each of the available products, determine a quantity of the available products on the display from the at least one live image based upon the identification of the available products on the display, obtain a current stock quantity for each of the plurality of available products within the store, provide the at least one live image to the user device for display thereon, permit user selection of one of the plurality of available products for purchase associated with the at least one live image, obtain historical stock data, operate a machine learning algorithm to set a threshold, the machine learning algorithm accepting as input thereto, the historical stock data, the quantity of the available products on the display, and the current stock quantity, the machine learning algorithm generating as output a predicted product sales rate of each of the plurality of available products and set the threshold based upon the predicted product sales rate, the machine learning algorithm being updated based upon obtaining updated current stock quantity data, updated historical stock data, and updated quantity of available products with each iteration of the machine learning algorithm, and when, for the user-selected available product, at least one of the quantity of available products is below the threshold and the current stock quantity is below the threshold, obtain a live image of the display adjacent the available product and comprising a replacement product, the live image of the display adjacent the available product being captured by one of the plurality of cameras, provide the live image of the display adjacent the available product and including the replacement product to the user device for display thereon so that the live image of the display including the replacement product is displayed with less than all the plurality of available products for purchase associated with the at least one live image, and cooperate with the user device to prompt the given user to select the replacement product for purchase.

9. The virtual shopping server of claim 8 wherein the processor is configured to generate and communicate a digital promotion for the replacement product for purchase to the user device.

10. The virtual shopping server of claim 8 wherein the processor is configured to communicate the user-selected available product to a product picker device, and when, for the user-selected available product, the at least one of the quantity of available products is below the threshold and the current stock quantity is below the threshold, communicate the replacement product for purchase to the product picker device.

11. The virtual shopping server of claim 8 wherein the processor is configured to determine a discrepancy, for the user-selected available product, between the quantity of the available products on the display and the current stock quantity in the store, and operate the machine learning algorithm to set the threshold based upon the discrepancy by accepting as input to the machine learning algorithm, the discrepancy.

12. The virtual shopping server of claim 8 wherein the processor is configured to obtain historical restock data and operate the machine learning algorithm to set the threshold based upon the historical restock data by accepting as input to the machine learning algorithm, the historical restock data.

13. A virtual shopping method comprising:
using a virtual shopping server to
store a plurality of reference characteristics associated with available products on a display within a store,
obtain a plurality of live images of the available products on the display within the store from a plurality of cameras within the store configured to capture the plurality of live images of the available products on the display within the store,
apply image recognition to identify the available products on the display based upon at least one of the plurality of live images by matching product characteristics associated with the available products and comprising packaging size, packaging shape, packaging color, and optically recognized package text, to the plurality of stored reference characteristics and by matching a machine readable code on each of the available products,
determine a quantity of the available products on the display from the at least one live image based upon the identification of the available products on the display,
obtain a current stock quantity for each of the plurality of available products within the store,
provide the at least one live image to a user device associated with a given user remote from the store for display thereon,
permit user selection of one of the plurality of available products for purchase associated with the at least one live image,
obtain historical stock data,
operate a machine learning algorithm to set a threshold, the machine learning algorithm accepting as input thereto, the historical stock data, the quantity of the available products on the display, and the current stock quantity, the machine learning algorithm generating as output a predicted product sales rate of each of the plurality of available products and set the threshold based upon the predicted product sales rate, the machine learning algorithm being updated based upon obtaining updated current stock quantity data, updated historical stock data, and updated quantity of available products with each iteration of the machine learning algorithm, and
when, for the user-selected available product, at least one of the quantity of available products is below the threshold and the current stock quantity is below the threshold,
obtain a live image of the display adjacent the available product and comprising a replacement product, the live image of the display adjacent the available product being captured by one of the plurality of cameras,
provide the live image of the display adjacent the available product and including the replacement product to the user device for display thereon so that the live image of the display including the replacement product is displayed with less than all the plurality of available products for purchase associated with the at least one live image, and
cooperate with the user device to prompt the given user to select the replacement product for purchase.

14. The method of claim 13 wherein using the virtual shopping server comprises using the virtual shopping server to generate and communicate a digital promotion for the replacement product for purchase to the user device.

15. The method of claim 13 wherein using the virtual shopping server comprises using the virtual shopping server to communicate the user-selected available product to a product picker device, and when, for the user-selected available product, the at least one of the quantity of available products is below the threshold and the current stock quantity is below the threshold, communicate the replacement product for purchase to the product picker device.

16. The method of claim 13 wherein using the virtual shopping server comprises using the virtual shopping server to determine a discrepancy, for the user-selected available product, between the quantity of the available products on the display and the current stock quantity within the store, and operate the machine learning algorithm to set the threshold based upon the discrepancy by accepting as input to the machine learning algorithm, the discrepancy.

17. A non-transitory computer readable medium for virtual shopping, the non-transitory computer readable medium comprising computer executable instructions that when executed by a processor cause the processor to perform operations comprising:
storing a plurality of reference characteristics associated with available products on a display within a store;
obtaining a plurality of live images of the available products on the display within the store from a plurality of cameras within the store configured to capture the plurality of live images of the available products on the display;
applying image recognition to identify the available products on the display based upon at least one of the plurality of live images by matching product characteristics associated with the available products and comprising packaging size, packaging shape, packaging color, and optically recognized package text, to the plurality of stored reference characteristics and by matching a machine readable code on each of the available products;
determining a quantity of the available products on the display from the at least one live image based upon the identification of the available products on the display;
obtaining a current stock quantity for each of the plurality of available products within the store;
providing the at least one image to a user device associated with a given user remote from the store for display thereon;
permitting user selection of one of the plurality of available products for purchase associated with the at least one live image;
obtaining historical stock data;
operating a machine learning algorithm to set a threshold, the machine learning algorithm accepting as input thereto, the historical stock data, the quantity of the available products on the display, and the current stock quantity, the machine learning algorithm generating as output a predicted product sales rate of each of the plurality of available products and set the threshold based upon the predicted product sales rate, the machine learning algorithm being updated based upon obtaining updated current stock quantity data, updated historical stock data, and updated quantity of available products with each iteration of the machine learning algorithm; and when, for the user-selected available product, at least one of the quantity of available products is below a threshold and the current stock quantity is below the threshold,
- obtaining a live image of the display adjacent the available product and comprising a replacement product, the live image of the display adjacent the available product being captured by one of the plurality of cameras,
- providing the live image of the display adjacent the available product and including the replacement product to the user device for display thereon so that the live image of the display including the replacement product is displayed with less than all the plurality of available products for purchase associated with the at least one live image, and
- cooperating with the user device to prompt the given user to select the replacement product for purchase.

18. The non-transitory computer readable medium of claim 17 wherein the operations comprise generating and communicating a digital promotion for the replacement product for purchase to the user device.

19. The non-transitory computer readable medium of claim 17 wherein the operations comprise communicating the user-selected available product to a product picker device, and when, for the user-selected available product, the at least one of the quantity of available products is below the threshold and the current stock quantity is below the threshold, communicating the replacement product for purchase to the product picker device.

20. The non-transitory computer readable medium of claim 17 wherein the operations comprise determining a discrepancy, for the user-selected available product, between the quantity of the available products on the display and the current stock quantity within the store, and operate the machine learning algorithm to set the threshold based upon the discrepancy by accepting as input to the machine learning algorithm, the discrepancy.

\* \* \* \* \*